INVENTOR.
MICHAEL C. HORNUNG
EVERETT J. TASSET
ATTORNEYS

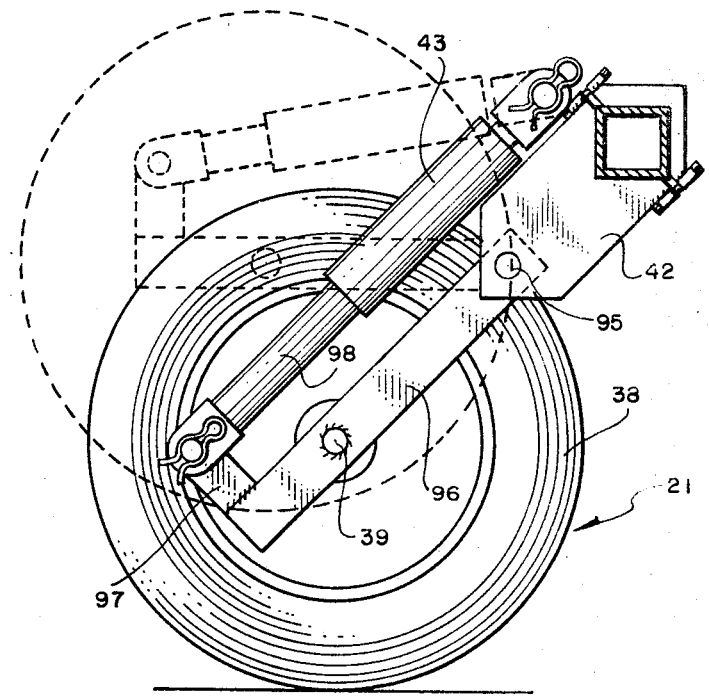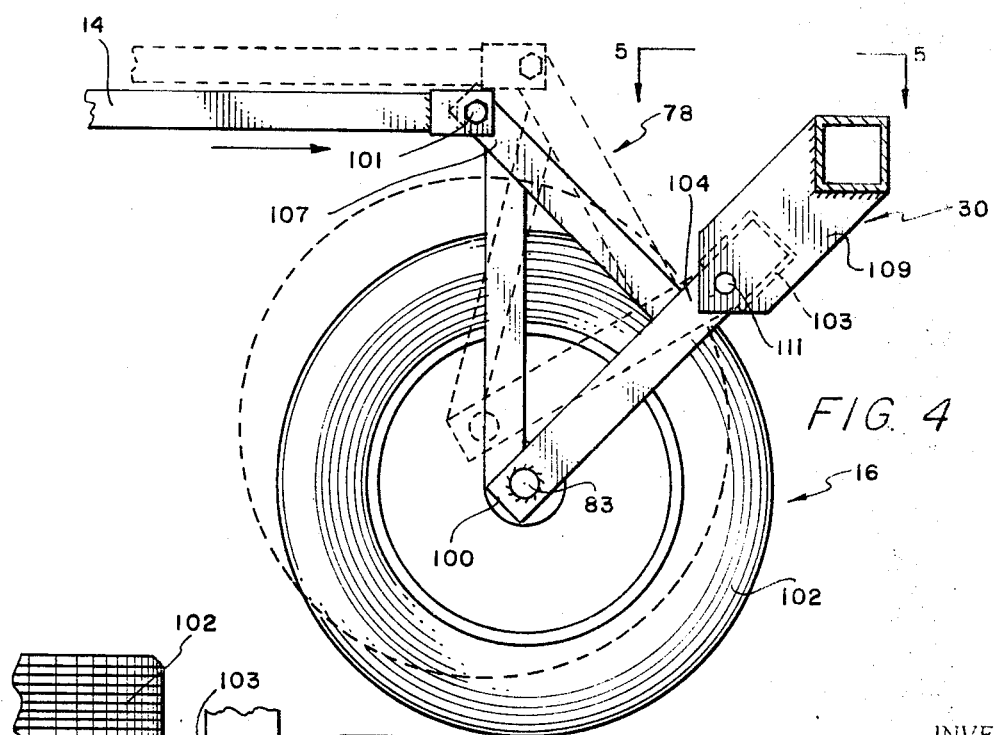

United States Patent Office 3,521,905
Patented July 28, 1970

3,521,905
WHEEL MOUNTING MEANS FOR A FOLDABLE FRAME STRUCTURE
Everett J. Tasset and Michael C. Hornung, both of Spearville, Kans. 67876
Filed Oct. 9, 1967, Ser. No. 673,783
Int. Cl. B62d 53/00
U.S. Cl. 280—411                                              3 Claims

ABSTRACT OF THE DISCLOSURE

A foldable frame structure having a first wheel means pivotally connected to the frame member of the foldable frame structure operating in response to a linkage member and a first cylinder and piston means carried by the frame member wherein the linkage member in first cylinder and piston means are constructed and connected so that on operating the first cylinder and piston means the linkage member moves in response to raise and lower the first wheel means. A second wheel means is provided pivotally connected to the end portions of the support beam of the foldable frame structure. The second wheel means carries a second cylinder and piston means which operate to raise and lower the second wheel means independently of the movement of the first wheel means thereby facilitating movement of the foldable frame structure from one location to another when in the folded position and, at the same time, serving to support the support beam of the foldable frame structure when the foldable frame structure is in an extended working position.

---

This invention relates to implements. In one aspect it relates to foldable frame structures of farm implements. In another aspect it relates to a wheel mounting means for a foldable frame structure having a first wheel means pivotally connected to the frame member of the foldable frame structure and a second wheel means pivotally connected to the end portion of a sectional support beam of the foldable frame structure, said first and second wheel means being constructed and connected so that said first and second wheel means are independently operated.

Various wheel mounting means for agricultural equipment are known in the prior art and generally consist of the plurality of wheels attached to the frame structure and provide a means for raising and lowering the implement carried by the frame for transportation purposes. Other types of farm working implements wherein a foldable frame is employed are known. Generally, these implements are folded in an upwardly direction and, when wheel mounting means are necessary to support the same, the wheels are rigidly affixed to the end portions. These prior art devices are in many instances structurally complicated, requiring specially designed clamping and connecting means and, therefore, are of a rather expensive construction. Additionally, the wheel mounting means of the prior art for foldable frame structures and the like are often of substantial size and weight in order to support the implement in a raised position and, therefore, such devices are costly to manufacture, difficult to transport from one location to another, and frequently do not compensate for the stress and strain placed on the implement when in the transporting position which leads to breakdowns and costly repairs.

It is very desirable to employ a foldable frame structure wherein the implement carried by the foldable frame structure is maintained in a horizontal position, at all times, i.e., in both the folded and standard working position, and at the same time provide for wheel mounting means for easy transportation of the implement while in the folded position and, at the same time, provide for support of the extremities of the implement when in the working position. Because of the desirability to employ agricultural implements which can work a large swath of ground in a single path, the wheel means of the prior art are undesirable. A wheel means capable of lowering the implement into the working position and operating independently of a supporting wheel means for the implement is desirable. Further, it is desirable to raise the supporting wheel means of the implement when the implement is in a folded position to facilitate transportation from location to location while, at the same time, providing a means for lowering the wheel means supporting the frame structure thereby raising the entire implement to prevent damage thereto. Further, it is desirable that the wheel means be constructed so that the stress and strain are not placed on hydraulic linkage members and the like thereby causing damage to the linkage members when the implement is in a raised position.

According to the present invention, we have now provided a wheel mounting means for a foldable frame means having a frame member and a support beam pivotally connected to said frame member and transversely extending therefrom having a first wheel means pivotally connected to said frame member. A linkage member is connected at its rearward end portion to said first wheel means and to a first cylinder and piston means carried by said frame member at its forward end portion. The first wheel means, linkage member and first cylinder and piston means are constructed and connected so that upon operating said first cylinder and piston means, said linkage member moves in response to raise and lower said first wheel means pivotally connected to said frame member. A second wheel means is likewise provided which is pivotally connected to the end portions of the support beam for supporting the support beam, when said first wheel members are in a raised position, and thus the implement carried thereon. A second cylinder and piston means is carried by said second wheel means and said second cylinder and piston means are constructed and connected so that upon operation of said second piston and cylinder means, second wheel means is caused to be raised and lowered in response thereto independently of the movement of the first wheel means.

Further, according to the invention, we have found that by pivotally connecting said first wheel means to said linkage member and said support beam through a triangular shaped connecting member that said sectional support beam and thus the implement carried thereon can be folded so as to maintain said sectional support beam and thus the implement mounted thereon in a horizontal position at all times.

Further according to the invention, we have found that by employing the unique wheel mounting means of the present invention that said first wheel means and second wheel means can be operated independently of each other, thus providing a wheel mounting means for a folded structure which is structurally sound, requires less maintenance, and is relatively inexpensive in construction.

An object of this invention is to provide a unique wheel mounting means for a frame structure.

Another object of this invention is to provide a novel wheel mounting means for a forwardly foldable frame structure wherein the frame structure is maintained in a horizontal position in both the extended working position and the folded position.

Another object of this invention is to provide for a foldable frame structure having a frame member and a sectional support beam connected thereto wherein a first wheel means is employed to support the frame member and a second wheel mounting means is employed to support the end sections of the sectional support beam.

Another object of this invention is to provide a wheel mounting means for a first and second wheel means wherein said first and second wheel mounting means operate independently of each other.

Another object of this invention is to provide a wheel mounting means for the end portion of a sectional support beam of a foldable frame structure which can be raised and lowered independently of the wheel mounting means for the frame structure and, when in the folded position, said second wheel mounting means can be raised thereby providing easy transportation of the foldable frame structure from one location to another.

Another object of this invention is to provide a farm implement having a foldable frame structure with wheel means having connecting means that provide quick, easy, and simple adjustments thereof.

Another object of this invention is to provide a new wheel mounting means for a foldable frame structure which is structurally sound economical to manufacture, simple to operate, and thus provides for an improved foldable frame structure.

Various other objects, advantages, and features of the invention will become apparent to those skilled in the art from the following discussion, taken in conjunction with the accompanying drawings in which:

FIG. 3 is an enlarged elevational view of the second wheel means taken along line 3—3 of FIG. 1;

FIG. 4 is an enlarged elevational view of a first wheel mounting means for a foldable frame means of this invention taken along line 4—4 in FIG. 1; and FIG. 5 is a fragmentnary enlarged perspective view taken along line 5—5 of FIG. 4.

Figures 1, 2:
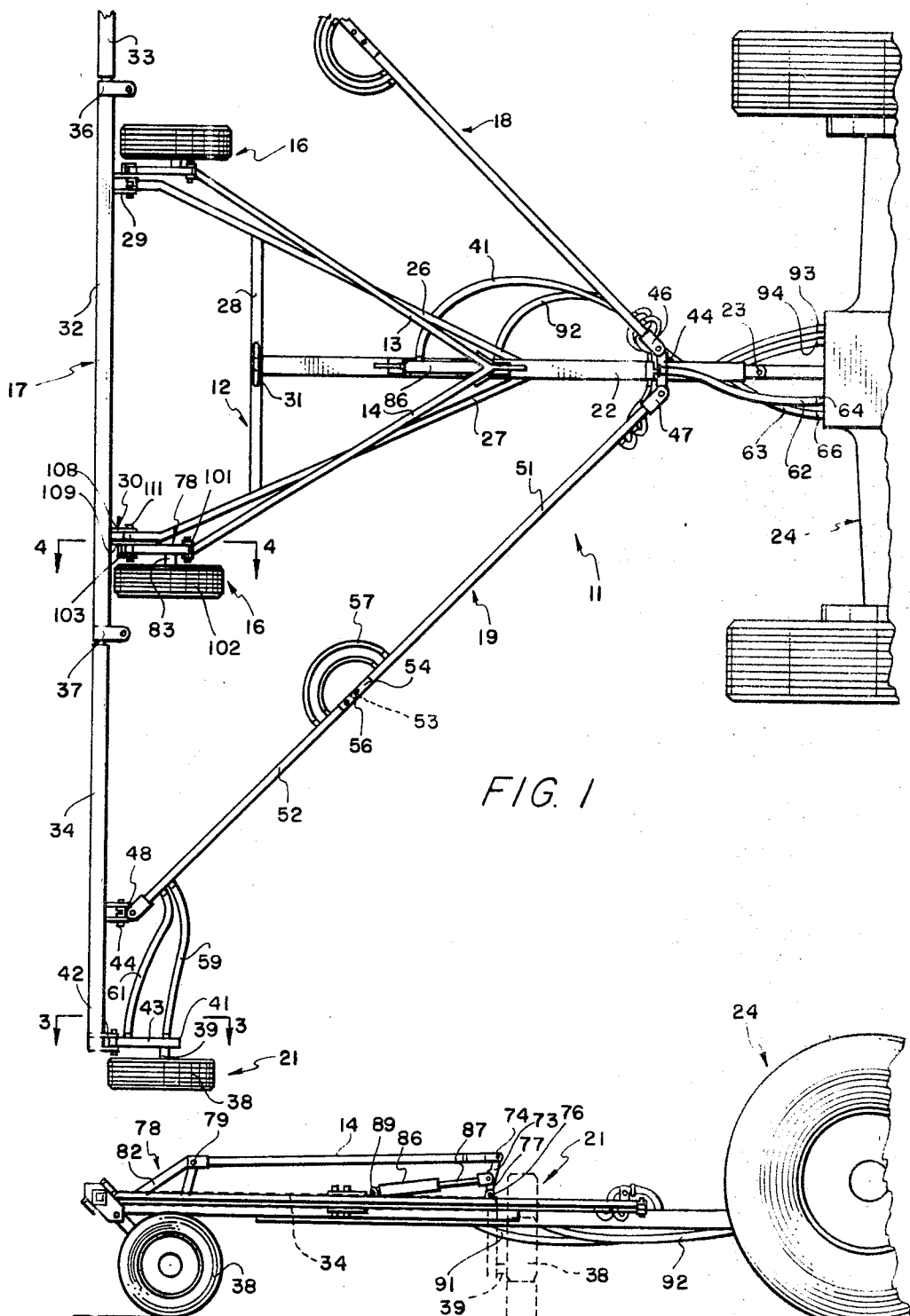
FIG. 1 is a fragmentary top plan view of a wheel mounting means having a first and second foldable frame structure according to the present invention.
FIG. 2 is a side plan view of FIG. 1 showing the frame structure in an extended working position wherein the end section of a sectional support beam is supported by the second wheel means and incorporating dashed lines to illustrate the extended and retracted position of the second wheel means when the frame structure is in a folded position.

The following is a discussion and description of preferred specific embodiments for the wheel mounting means of a foldable frame structure of this invention, such being made with reference to the drawings whereupon the same reference numerals are used to indicate the same or similar parts and/or structure. It is to be understood that such discussion and description is not to unduly limit the scope of the invention. In the following description of the drawings only one element of a plurality of similar elements will be described for the sake of simplicity.

Referring now to the drawings in detail, and in particular to FIG. 1, there is shown a foldable frame structure 11 connected to a conventional farm tractor 24 or the like. Frame structure 11 is provided with a generally horizontally disposed A-shaped frame means 12, a pair of forwardly converging elongated linkage members 13 and 14, a pair of first wheel means 16, a sectional support beam 17, a pair of forwardly converging folding link conduit means 18 and 19, and a pair of second wheel means 21.

A-shaped frame means 12 is provided with tongue member 22 having an aperture 23 in its forward end portion for connecting the frame structure 11 to a tractor 24, and the like. A-shaped frame means 12 is likewise provided with forwardly converging elongated member 26 and 27 secured to tongue member 22 and connected rearwardly therefrom by cross member 28, which is also connected to tongue member 22. The rearwardmost ends of elongated members 26 and 27 are pivotally connected to sectional support beam 17 by bracket means 29 and 30 thereby connecting sectional support beam 17 to A-shaped frame means 12 so that sectional support beam 17 transversely extends therefrom. Lock means 31 is mounted intermediate on cross member 28 at a point adjacent tongue member 22 when the cross member 28 and tongue member 22 are joined.

Sectional support beam 17 is provided with central section 32 having opposed end sections 33 and 34 pivotally connected to central section 33 by a plurality of hinge means 36 and 37. Central section 32, and opposed end sections 33 and 34 are preferably formed of a square-shape or rectangular tube material and positioned so that central section 32 and opposed end sections 33 and 34 can be aligned through hinge means 36 and 37 or opposed end sections 33 and 34 can be forwardly folded with respect to central section 32 at hinge means 36 and 37. Opposed end sections 33 and 34 of sectional support beam 17 are supported by a pair of second wheel means 21.

Second wheel means 20 only one of which is shown is provided with wheel 38 positioned at the outer end portion of opposed end section 34. Wheel 38 is operatively connected to axial spindle 39 which is connected to and supported from arm 41 depending from bracket 42 which in turn is secured to opposed end section 34 of sectional support beam 17 by any suitable means such as welding, clamping, bolting, and the like. Cylinder and piston means, such as hydraulic cylinder 43 is mounted on arm 41 and is operatively connected to opposed end section 34 so that upon activation of hydraulic cylinder 43 wheel 38 is caused to be raised and lowered in response thereto. The other one of the pair of second wheel means 21 is similarly connected to the end portion of opposed end section 33 of sectional support beam 17.

Forwardly converging folding link conduit means 18 and 19 are pivotally connected at the forward extending portion of tongue member 22 of A-shaped frame means 12 by bracket 44 and hinge elements 46 and 47. Bracket 44 is connected to tongue member 22 by any suitable means such as welding, bolting, and the like. Folding link conduit means 18 and 19 are pivotally connected at their rearwardmost ends to opposed end sections 33 (not shown) and 34 of sectional support beam 17, respectively, by knuckle means 48 and pin element 49. Folding link conduit means 19 is provided with two fluid-tight conduit members 51 and 52 and folding link conduit means 18 is likewise provided with two fluid-tight conduit members. Fluid-tight conduit members 41 and 42 are pivotally connected at their adjacent ends by hinge means 53. Fluid-tight conduit members 51 and 52 of folding link conduit means 19 can be maintained in aligned position, as can the two fluid-tight conduit members of folding link conduit means 18, or in a folded position for transportation from one location to another. Plate element 54 is mounted on folding link conduit means 19, so that when fluid-tight conduit members 51 and 52 of folding link conduit means 19 are aligned, pin element 56 can be inserted within plate element 54 and thus fluid-tight conduit member 52 thereby maintaining folding link conduit means 19 in a relatively fixed position. When it is desirable to fold frame structure 11 pin element 56 is removed from plate element 54 and thus fluid-tight conduit member 52 and folding link conduit means 19 is moved inwardly over frame means 12 and positioned within lock means 31. Upon causing folding link conduit means 19 to be moved inwardly, opposed end section 34 of sectional support beam 17 is caused to be moved in a forward direction with respect to central section 32 of sectional support beam 17. Due to the unique design of hinge means 37, opposed end section 34 of sectional support beam 17 remain in a horizontal position when in the extended position and when in the folded position.

A plurality of flexible conduit means, such as hose members 57 and 58 are connected to adjacent end portions of fluid-tight conduit members 51 and 52 of folding link conduit means 19 so that the fluid-tight conduit members 51 and 52 are in fluid communication with each other. A second plurality of flexible conduit means, such as hose members 59 and 61 are connected to the rearwardly extending portion of folding link conduit means 19 at one end and to hydraulic cylinder 43 carried by arm 41 of wheel means 21 at the other end thus providing fluid communication between folding link conduit means 19 and hydraulic cylinder 43. A third plurality of flexible conduit means, such as hose members 62 and 63, are connected at one end to connector means 64 and 66 mounted on tractor 24 which in turn are connected to a fluid supply source (not shown). The other end of hose members 62 and 63 are connected to two coupling T-members such as indicated by 67. As illustrated in FIG. 1, coupling T-member 67 is shown connected to hose 62. Flexible conduits, such as hose members 68 and 69 are connected to coupling T-member 67 and to the forwardly converging end portion of folding link conduit means 18 and 19, respectively, thereby providing fluid communication between the fluid supply source, folding link conduit means 18 and 19 and thus hydraulic cylinder 43 of wheel means 21. A second coupling T-member (not shown) is likewise connected to hose 63 and flexible conduits, such as hose members 71 and 72 are connected to a second coupling T-member at one end and to the forwardly converging end portions of folding link conduit means 18 and 19, respectively, at the other end thereby providing fluid communication between the fluid supply source, folding link conduit means 18 and 19, and thus hydraulic cylinder 43 of wheel means 21.

Referring now to FIG. 2, in conjunction with FIG. 1, forwardly converging elongated linkage member 14 is pivotally connected at its forwardmost end portions to linkage members 73 by any suitable means, such as pin element 74. Linkage member 73 is then connected to couple member 76 by pin element 77 to allow linkage member 73 to be moved in a back and forth direction. Coupling member 76 is then connected to tongue member 22 of A-shape frame means 12. The rearwardly extending end portion of elongated member 14 is pivotally connected to connecting means 78 by pin element 79. Connecting means 78 is provided with leg members 81 and 82. Leg member 81 is pivotally connected to axial spindle of wheel means 16 and leg member 82 is pivotally connected to bracket means 84 which in turn is mounted on bracket means 30 which is connected to central section 32 of sectional support beams 17. As can clearly be seen elongated linkage member 14, and thus elongated linkage member 13 (not shown) are maintained above and in a spaced relationship with A-shape frame means 12 by linkage member 73, coupling member 76 and connecting means 78.

A second cylinder and piston means, such as pneumatic cylinder or hydraulic cylinder 86, is provided with a shaft member 87 which is pivotally connected at one end to linkage member 73 by pin element 88. Hydraulic cylinder 86 is then mounted on tongue member 22 of A-shape frame means 12 by any suitable means such as bracket and pin 89 and the like. A plurality of fluid conducting means, such as hose members 91 and 92, are operably connected to hydraulic cylinder 86 at one end and to connector means 93 and 94 mounted on tractor 24 at the other end. Connector means 93 and 94 are in fluid communication with the fluid source (not shown) carried by tractor 24.

Referring now to the dashed lines of FIG. 2 opposed end section 34 of sectional support beam 17 has been positioned in a forwardly extending folded position with respect the central secetion 32. Wheel member 38 of second wheels means 21 is shown in a downward extended position and in a retracted position. As can clearly be seen wherein wheel member 38 is in a retracted position due to the operation of hydraulic cylinder 43 carried by arm 41 of second wheel means 21 the foldable structure can be transported without damage to second wheel means 21. Referring now to FIG. 3, in conjunction with FIG. 1, second wheel means 21 is shown having wheel member 38 fixedly attached to axial member 39 and to first support member 96. First support member 96 is in turn pivotally connected to bracket means 42 mounted on the end portion of opposed end section 34 of sectional support beam 17 at one end by pin element 95 and to second support member 97 at the other by any suitable means such as welding and the like. First and second support members 96 and 97 are joined to form substantially a right angle and hydraulic cylinder 43 having reciprocating shaft member 98 is mounted thereon. The end portion of shaft member 98 is pivotally connected to second support member 97 by pin and lay means 99 and hydraulic cylinder 43 is pivotally connected at its end removed from shaft member 98 to the upper exterior surface of bracket means 42 mounted on the end portion of opposed end section 34 of sectional support beam 17 thus maintaining hydraulic cylinder 43 and reciprocating shaft member 98 in a spaced relationship about first support member 96. As can clearly be seen in FIG. 4, when hydraulic cylinder 43 is activated thus causing shaft member 98 to be retracted into hydraulic cylinder 43 first support member 96 is pivoted on pin element 95 thus causing wheel member 38, first support member 76, second support member 97 and hydraulic cylinder 42 to be raised to the position shown by the dotted lines. By employing the above combination of elements second wheel means 21 can be raised or lowered as desired independently of movement of first wheel means 16.

Referring now to FIG. 4 in conjunction with FIG. 1 first wheel means 16 is pivotally connected to elongated forwardly converging linking member 14 of A-shaped frame means 12 by pin element 101. First wheel means 16 is provided with a wheel member 102 fixedly attached to axial spindle 83. Axial spindle 83 is operatively connected to connecting means 78. Connecting means 78 is pivotally connected to bracket means 103 mounted on bracket meas 30 connected to A-shaped frame means 12 and sectional support beam 17 and to the rearwardly extending end portion of elongated member 14 by pin element 101. It can be seen that this embodiment connecting means 78 is a triangular shape connecting member pivotally connected near its rearwardly extending apex 104 to a bracket means 103 mounted on bracket means 30 which, in turn, connects A-shaped frame member 12 and control section 32 of sectional support beam 17. Axial member 83 of wheel member 102 is fixedly connected to a downwardly extending apex 106 of triangular shaped connecting means 78, and elongated linkage member 14 is pivotally connected near the upwardly, forwardly extending apex 107 of triangular shaped support member 78.

Bracket means 30 is provided with two leg members 108 and 109 mounted on central section 32 of sectional support beam 17 in a parallel spaced relationship and each leg member is provided with axially alinged openings therein. The two leg members, such as leg member 109 is fixedly mounted on support beam 17 and pivotally connects A-shaped frame means 12 to central section 32 of sectional support beam 17.

Bracket means 103, an L-shaped bracket mounted on the outer surface of leg member 109 and L-shaped bracket means 103 is provided with an axially aligned opening which is aligned with the openings of leg members, 108 and 109 of bracket means 30. Connecting means 78 here shown as a triangular shaped connecting member is pivotally connected to bracket 103 and thus to bracket means 30 by pin element 111 thus providing pivoting means for raising and lowering first wheel means 16 while maintaining sectional support beam 17 in a horizontal position.

Referring now to FIG. 5 the position of L-shaped bracket means 103 having connecting means 78 positioned therein with respect to leg member 109 of bracket means 30 can easily be seen. As has previously been mentioned, by employing the wheel mounting means of the present invention for the first and second wheel means of the folding frame structure the implement carried on the foldable frame structure is maintained in a horizontal position at all times. Further, by utilizing a first and second wheel which operate independently of each other the second wheel means can be raised when the structure is folded thereby preventing damage to the same as the frame structure is transported.

In actual operation foldable frame structure 11 is connected to tractor 24 and is transported in folded position (see dashed line of FIG. 2) to the field to be worked. When foldable frame structure 11 is in a folded position second wheel means 20 is positioned in a raised position and first wheel means 16 is in a lowered position thus providing transportation of the implement from one location to the other. An important advantage of the present invention of the wheel mounting means is that the forwardly foldable opposed end sections of the sectional support beam remain in a horizontal position when in the folded position, as well as in the extended working position. When it is desirable to unfold foldable frame structure 11 and position it in the extended working position (see FIG. 1) and activator lever or switch operably connected to the fluid supply source on tractor 24, is operated thereby providing activating fluid to hydraulic cylinder 43 of second wheel means 21 through hose members 62 and 63, folding link conduit means 19, and hose members 57, 58, 59 and 61. Both wheels of second wheel means 21 operate from the same fluid source and at the same pressure, but independently of each other. Once second wheel means 21 is positioned in the downwardly extended position one of the folding link conduit means, such as folding conduit means 19 is removed from lock means 31 and opposed end section 34 of sectional support beam 17 is moved in a rearwardly direction pivoting at hinge means 37. When opposed end section 34 is in aligned position with central section 32 of support beam 17, fluid-tight conduits 51 and 52 of folding link conduit means 19 are also aligned with each other. The same procedure is then followed to align opposer end section 33 of sectional support beam 17 with opposed end section 34 and central section 32 folding link conduit means 18 and 19 are then secured such as by plate element 54 and pin element 56 thereby maintaining the same in a relatively fixed position. Sectional support beam 17 is now in the extended working position as shown in FIG. 1, and sectional support beam 17 and thus the implement attached thereto are in the raised position and maintained therein by first wheel means 16. In order to lower sectional support beam 17 and thus the implement attached thereto, hydraulic cylinder 86 carried by A-shaped frame means 12 is activated by a lever or selector switch on tractor 24. As hydraulic cylinder 86 is activated shaft 87 of hydraulic cylinder 86 is retracted and forwardly elongated linkage member 14 which is pivotally connected to the forward end of the shaft 87 through linkage member 73 is caused to be moved in a rearward direction. The rearwardly extending end portion of forwardly converging elongated linkage member 14 is pivotally connected to connecting means 78 which in turn is pivotally connected to first wheel means 16 and bracket means 103 which is mounted on bracket means 30 connected to central section 32 of sectional support beam 17. As elongated linkage member 14 is moved rearwardly the upper portion of connecting means 78 is likewise moved rearwardly thus moving the lower portion of connecting means 78 which is connected to first wheel means 16 in a forward upwardly extending direction and at the same time lowering sectional support beam 17 and thus the implement connected thereto into the desired working position. As is clearly evident from the above description, first wheel means 16 and second wheel means 21 are operated independently of each other.

When it is desirable to position the foldable frame structure in the forwardly extending folded position, hydraulic cylinder 86 is activated thus causing shaft 87 and elongated linkage member 14 to be moved in a forward direction thus lowering first wheel means 16 and raising sectional support beam 17 thus removing the implement connected thereto from contact with the ground. A second selector switch or lever carried by the tractor is then employed to activate the hydraulic cylinder 43 carried by second wheel means 21 thus causing second wheel means 21 to be operated to raise wheel member 38. Folding conduit link means 18 and 19 are then caused to be moved in an inward direction over A-shaped frame means 12 and into position within lock means 31. By the lowering of first wheel means 16 and the raising of second wheel means 21, second wheel means 21 are positioned so that the foldable frame structure and thus the implement carried thereon can readily be moved from one location to another without the second wheel means contacting the ground and thus causing damage thereto.

While the above operative steps have been described as first activating hydraulic cylinder 86 to lower first wheel means 16 and subsequently activating hydraulic cylinder 43 to raise second wheel means 21 when folding the foldable frame structure, it should be noted that because first wheel means 16 and second wheel means 21 operate independently of each other both the first wheel means 16 and the second wheel means 21 can be activated simultaneously by manipulating the activator switches or levers simultaneously.

The foregoing discussion and description has been made in connection with preferred specific embodiments of the wheel mounting means of the invention. However, it is to be understood that the discussion and description is only intended to illustrate and teach those skilled in the art how to practice the invention and such is not to unduly limit the scope of the invention which is defined in the claims hereinafter.

We claim:

1. In frame means having a frame member, a support beam pivotally connected to said frame member and transversely extending therefrom, wheel means pivotally connected to said frame member, a linkage member connected in its rearward end portion to said wheel means, and actuating cylinder means carried by said frame member and connected to said linkage member in the forward end portion thereof, said wheel means, linkage member and cylinder means being constructed and connected so that upon operating said cylinder means said linkage member moves in response to raise or lower said wheel means, that improvement comprising:

(a) other wheel means pivotally connected to the end portion of said support beam and comprising, a wheel having an axial member fixably attached to a first support member, said first support member being pivotally connected to a bracket mounted to an end portion of said support beam at one end portion and to a second support member at the other end portion, said first support member and said second support member being joined to form substantially a right angle, and (b) other actuating cylinder means carried by said other wheel means comprising, a hydraulic cylinder having a piston and rod and the other end portion of said rod pivotally connected to second said support member and said hydraulic cylinder pivotally attached at its head end to the upper exterior surface of said bracket thereby maintaining said other cylinder means in a spaced relationship with first said support member, said other cylinder means being independently operable from said first-named cylinder means, and upon operation raising or lowering said other wheel means independently of movement of said first-named wheel means.

2. A foldable frame means having:
(a) a frame structure,
(b) a sectional support beam with a central section and opposed end sections pivotally connected to said central section, said central section being pivotally connected to said frame structure and transversely extending therefrom,
(c) first wheel means comprising a plurality of wheels each having an axial member and pivotally connected to said frame structure,
(d) a linkage member connected in its rearward end portion to said first wheel means,
(e) a generally triangular shaped support member fixedly attached to said axial member at its downwardly extending apex portion, pivotally connected to the rearwardly extending end portion of said linkage member at its upward forwardly extending apex portion and pivotally connected at its rearwardly extending apex portion to a bracket means mounted on said frame structure,
(f) first cylinder and piston means carried by said frame structure and connected to said linkage member in the forward end portion thereof, said first wheel means, linkage member and first cylinder and piston means being constructed and connected so that upon operating said cylinder and piston means said linkage member moves in response to raise or lower said first wheel means pivotally connected to said frame structure,
(g) other wheel means comprising a plurality of wheels, each wheel having an axial member fixedly attached to a first support member, said first support members being pivotally connected to brackets mounted on said opposed end sections of said sectional support beam at one end portion and to a second support member at the other end portion, said first and second support members being joined to form substantially a right angle, and
(h) other hydraulic cylinders having reciprocating piston rods and the end portions of said rods are pivotally connected to said second support member and the hydraulic cylinders are pivotally connected in their head end portions to the upper exterior surface of said brackets mounted on said opposed end sections of said sectional support beam, thereby maintaining said hydraulic cylinders and reciprocating rods in spaced relation above said first support member, said other cylinders upon operation raising or lowering said other wheel means independently of movement of said first wheel means.

3. The means according to claim 2, wherein said bracket means comprises:
(a) a pair of forwardly extending leg members mounted on the central section of said support beam in substantially parallel spaced relation, each leg member having an axially aligned opening therein; said leg members thereby pivotally connecting said frame structure to said central section of said sectional support beam; and
(b) an L-shaped bracket connected to the outer one of said leg members, said L-shaped bracket having an opening being axially aligned with the openings of said leg member, said L-shaped bracket thereby pivotally connecting the rearwardly extending apex of said triangular support member thereto thus providing pivoting means for raising and lowering first-named wheel means while maintaining said sectional support beam in a horizontal position.

References Cited

UNITED STATES PATENTS

| | | | |
|---|---|---|---|
| 2,641,886 | 6/1953 | Graham | 172—311 |
| 3,180,429 | 4/1965 | Perhink | 172—456 |
| 3,190,367 | 6/1965 | Kopaska | 172—456 |
| 3,362,483 | 1/1968 | Twidale | 172—456 |
| 3,414,064 | 12/1968 | Foster | 172—311 |

LEO FRIAGLIA, Primary Examiner

U.S. Cl. X.R.

172—311, 456